(12) United States Patent
Kim (10) Patent No.: US 7,882,131 B2
(45) Date of Patent: Feb. 1, 2011

(54) WEB SERVICE PROVIDING APPARATUS, WEB SERVICE REQUESTING APPARATUS, AND METHOD OF THE SAME

(75) Inventor: Joo-hyun Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 11/516,522

(22) Filed: Sep. 7, 2006

(65) Prior Publication Data

US 2007/0055676 A1 Mar. 8, 2007

(30) Foreign Application Priority Data

Sep. 7, 2005 (KR) .................. 10-2005-0083299

(51) Int. Cl.
 *G06F 17/30* (2006.01)
(52) U.S. Cl. ..................................... 707/781
(58) Field of Classification Search ................ 707/102, 707/781

See application file for complete search history.

(56) References Cited

U.S. PATENT DOCUMENTS

| 6,314,456 | B1 | 11/2001 | Van Andel et al. |
| 2003/0005181 | A1* | 1/2003 | Bau et al. .................... 709/330 |
| 2003/0110373 | A1* | 6/2003 | Champion .................. 713/153 |
| 2003/0163450 | A1* | 8/2003 | Borenstein et al. ............. 707/1 |
| 2003/0220925 | A1* | 11/2003 | Lior ............................ 707/10 |
| 2004/0006651 | A1 | 1/2004 | Dani et al. |

FOREIGN PATENT DOCUMENTS

| JP | 2005-063132 A | 3/2005 |
| KR | 10-2002-0016711 A | 3/2002 |
| KR | 10-2005-0026425 A | 3/2005 |

OTHER PUBLICATIONS

W3C, Web Services Description Language (WSDL) 1.1, Mar. 15, 2001.*
Wikipedia, XML, Sep. 6, 2005.*

(Continued)

*Primary Examiner*—James Trujillo
*Assistant Examiner*—William Spieler
(74) *Attorney, Agent, or Firm*—Sughrue Mion, PLLC (57) ABSTRACT

A web service providing apparatus and a web service requesting apparatus that use an inheritable web service by including access modifiers and inheritance relationships for domains, functions, and services in a WSDL for the web service and by referring to the access modifiers and the inheritance relationships, and method of the same. The web service providing apparatus includes: a storage unit that stores an interface document comprising inheritance information and service processing logic; a message generating unit that, with reference to the service processing logic, generates a response message comprising at least one of a result value for a request of a web service and a providing location where the result value is calculated; and a message transmitting/receiving unit that, according to a web service specification, receives a request message comprising the request of the web service and transmits the generated response message as a response to the request message.

34 Claims, 10 Drawing Sheets

OTHER PUBLICATIONS

Computing.net, access server restrictions, Jun. 2, 2004.*
Rosenberg et al., Securing Web Services with WS-Security, 2004, pp. 222-228.*
Kreger, Heather: "Web Services Conceptual Architechture (WSCA 1.0)", Internet Citation, [Online], May 2001, XP002203346, Retrieved from the Internet: <URL: http://www-3.ibm.com/software/solutions/webservices/pdf.WSCA.pdf> retrieved on Jun. 24, 2002, Web Services Overview, p. 6, The Web Services Model, p. 7-9.
Finkelstein, Anthony, et al: "Object Orientation and Web Services", ECOOP 2003, Lecture Notes on Computer Science 3013, Jul. 21, 2003, pp. 179-189, XP019008901, Darmstadt, DE.
Gao, Xiang: "Web Services Package Reuse and Dynamic Composition", Proceedings of the World MultiConference on Systemics, Cybernectics and Informatics, vol. 16, 2003, pp. 226-231, XP001248597.
Moreau, J-J: "What's New in WSDL 2.0?", XML Europe 2004, Conference Proceedings, [Online], Apr. 19, 2004, pp. 1-28, XP007901587, Amsterdam, NL, Retrieved from the Internet: URL: http://www.idealliance.org/papers/dx_xmle04/html/abstract/040204.html, retrieved on Jan. 15, 2007, p. 12-14.
Andrea, V. D. et al: "Interface inheritance for object-oriented service composition based on model driven configuration", $2^{nd}$ International Conference on Service Oriented Computing, ICSIC'04, [Online], Nov. 15, 2004, pp. 1-9, XP007901590, New York, US, retrieved from the internet: URL http://dit.unit.it.{aiellom/publications/icsoc04forum.pdf>, retrieved on Jan. 22, 2007.
Carlisle Adams & Sharon Boeyen: "UDDI and WSDL Extensions for Web Services: A Security Framework," Proceedings of the 2002 ACM workshop on XML security, Nov. 22, 2002.
Chandrasekaran et al. "Ninja Paths: An Architecture for Composing Services Over Wide Area Networks" CS262 class project write-up, 2000, UC Berkeley. 15 pages.

* cited by examiner

610a   <domain restriction="public"/>
620a   <domain restriction="private">
    <network type="IP">
        <range>
            <min>192.168.0.0</min>
            <max>192.168.255.255</max>   650a
        </range>
    </network>
    <inheritance>
        true
    </inheritance>
</domain>
630a   <domain restriction="protected">
    <inheritance>
        true
    </inheritance>
</domain>

```
<?xml version="1.0" encoding="utf-8" ?>
<WebServices xmlns:xsd="http://www.w3.org/2001/XMLSchema"
    xmlns:xsi="http://www.w3.org/2001/XMLSchema-instance"
    xmlns="http://swc.sec.samsung.net/WSRM/MiniTest/2005/01">
    <WSDL_URL>http://rm.samsung.net/rmserver/wsdl</WSDL_URL>                  ~ 710
    <SOAPAction>http://rm.samsung.net/rmserver/register</SOAPAction>          ~ 720
    <Operation>registerDevice</Operation>
    <Reference>
        <ID>USERNAME</ID>                                                     ~ 730
        <Password>Password</Password>
    </Reference>
</WebServices>
```

WEB SERVICE PROVIDING APPARATUS, WEB SERVICE REQUESTING APPARATUS, AND METHOD OF THE SAME

CROSS-REFERENCE TO RELATED APPLICATIONS

This application claims priority from Korean Patent Application No. 10-2005-0083299, filed on Sep. 7, 2005, in the Korean Intellectual Property Office, the entire disclosure of which is incorporated herein by reference.

BACKGROUND OF THE INVENTION

1. Field of the Invention

Methods, apparatus, and systems consistent with the present invention relate to providing a web service and requesting a web service. More particularly, the present invention relates to a technique for providing and requesting a web service that allows use of an inheritable web service by including access modifiers and inheritance relationships for domains, functions, services and so forth in a web services description language (WSDL) having detailed information for a web service and by causing the web service providing apparatus and the web service requesting apparatus to refer to the access modifiers and inheritance relationships.

2. Description of the Related Art

Web services provide interoperability among Internet applications using extensible markup language (XML), simple object access protocol (SOAP), and WSDL.

XML is a text-based markup language specification from the World Wide Web Consortium (W3C). Unlike hypertext markup language (HTML), XML uses tags for describing both presentation and data. XML is useful for describing portable structured data, and XML is widely used for describing data as a data format, such as messaging protocols and interchange formats.

SOAP, which is an XML-based lightweight protocol for exchanging information in a distributed environment, defines a messaging protocol between a service requester and a service provider. In addition, SOAP provides a standard way for calling a remote service via XML-based messages, regardless of the platform, operating system, or programming language of the service to be called.

WSDL describes a service interface such as connection information for a service to be provided by a web service provider using XML, that is, the format of messages to be exchanged when binding and operation information.

WSDL thus serves to describe the web service. In order to describe the XML web service, it is necessary to define the messages to be generated and received. WSDL uses an XML schema to define these messages.

WSDL documents describe interfaces for calling a service to be provided by a service provider. WSDL documents include a message indicative of parameters required for calling the service, a type, a port type corresponding to the service to be called, bindings having binding operation information, a port for calling the service, and the service.

A universal description, discovery, and integration (UDDI) registry, which is a web service relay system, assists in registration and search of the web services.

A basic model of a web service broadly includes a service requester, a service provider, and a service registry. The service provider registers the WSDL documents, including the information of the web services to be provided, in the service registry using the UDDI system.

The service requester searches a list of web services registered in the service registry using the UDDI system, selects a desired web service, and receives WSDL information for the service provider.

Then, the service requester calls the service of the service provider based on the WSDL information. At this time, the service provider and the service requester exchange the information using the SOAP protocol.

Figure 1:
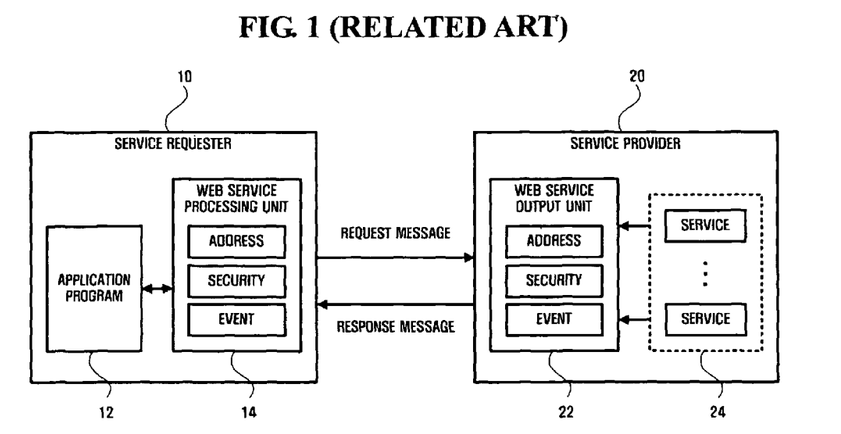
FIG. 1 is a diagram showing a web service system according to the related art.

FIG. 1 is a diagram showing a web service system according to the related art. Referring to FIG. 1, the web service system includes a service requester 10 and a service provider 20.

The service requester 10 includes a web service processing unit 14 that processes various web services and an application program 12 that performs the overall control for the apparatus.

The service provider 20 includes a web service output unit 22 that provides various web services and at least one service 24 that is provided to the service requester 10.

The web service processing unit 14 and the web service output unit 22 are web service specifications that process messages between the service requester 10 and the service provider 20. In FIG. 1, a web service specification about address, security, and events of various web service specifications is applied to the web service processing unit 14 and the web service output unit 22, and then the messages are processed.

That is, the service requester 10 that receives the WSDL information of the service provider 20 calls the service 24 of the service provider 20 on the basis of the WSDL information. At this time, the messages of the service call and service response are processed according to the web service specification of the web service processing unit 14 and the web service output unit 22.

In general, the web service provides the service requester 10 with the service 24 of the service provider 20 according to the WSDL defined by the service provider 20, not by the web service.

The service 24 of the service provider 20 is created by object-oriented programming. Inheritance between the services 24 is possible, but inheritance of the web service itself is not supported. For example, the service 24 provided by the service provider 20 can be reused by a service distributor (not shown) that relays the service 24 and can be provided to the service requester 10 through the concept of inheritance. However, inheritance of the web service for the entire service cannot be provided and the service cannot be reused by such a method.

Access to the service 24 itself can be provided by various methods, but direct access from the outside is impossible when the service 24 is provided through the web service. In general, the web service can provide various security features in order to prevent the service from being used in an unauthorized manner from the outside. However, the web service user cannot know which web services restrict access and which features in the web service are restricted.

Korean Patent Application No. 2002-016711 discloses a method of compulsorily controlling access to an object that inherits execution files relative to a web service by copying security authorization classes and category information according to multi-class security.

However, this method simply applies access limitations and inheritance for the execution files relative to the web service. Therefore, a method that can apply various kinds of access limitations and inheritance for a web service itself is increasingly demanded.

SUMMARY OF THE INVENTION

Exemplary embodiments of the present invention may overcome the above disadvantages and other disadvantages not described above. The exemplary embodiments of the present invention are not necessarily required to overcome any of the disadvantages described above, and the exemplary embodiments of the present invention may not overcome any of the problems described above. The appended claims should be consulted to ascertain the true scope of the invention.

The present invention provides a web service providing apparatus and a web service requesting apparatus which use an inheritable web service by including access modifiers and inheritance relationships for domains, functions, services, and so forth in a WSDL having detailed information for a web service and by causing the web service providing apparatus and the web service requesting apparatus to refer to the access modifiers and the inheritance relationships.

According to an aspect of the present invention, there is provided a web service providing apparatus which includes a storage unit that stores a predetermined interface document including inheritance information and service processing logic; a message generating unit that, with reference to the service processing logic, generates a response message including at least one of a result value for a request received by a web service and a location where the result value is calculated; and a message transmitting/receiving unit that, according to a prescribed web service specification, receives a request message including the request of the web service and transmits the generated response message as a response to the request message.

According to another aspect of the present invention, there is provided a web service requesting apparatus which includes a storage unit that stores an interface document including inheritance information; a message transmitting/receiving unit that transmits a request message for a web service according to a prescribed web service specification and, as a response to the request message, receives a response message including at least one of a result value for the web service and a location where the result value is calculated; and a web service processing unit that accesses the web service and performs processing for the web service with reference to the response message and the interface document.

According to yet another aspect of the present invention, there is provided a method of providing a web service, the method including storing a predetermined interface document including inheritance information and service processing logic; receiving a request message for a web service according to a prescribed web service specification; generating, with reference to the service processing logic, a response message including at least one of a result value for the request message and a providing location where the result value is calculated; and transmitting the generated response message according to the web service specification.

According to still another aspect of the present invention, there is provided a method of requesting a web service, the method including storing an interface document including inheritance information; transmitting a request message for a web service according to a prescribed web service specification; receiving, as a response to the request message, a response message including at least one of a result value for the web service and a location where the result value is calculated; and accessing the web service and performing processing for the web service with reference to the response message and the interface document.

BRIEF DESCRIPTION OF THE DRAWINGS

The above and other aspects of the present invention will become more apparent by describing in detail exemplary embodiments thereof with reference to the accompanying drawings, in which.

DESCRIPTION OF THE EXEMPLARY EMBODIMENTS

Aspects of the present invention and methods of accomplishing the same may be more readily understood by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete. The present invention will only be defined by the appended claims and equivalents thereof. Same reference numerals refer to analogous elements throughout the specification.

Hereinafter, exemplary embodiments of the present invention will be described in detail with reference to the accompanying drawings.

Figure 2:
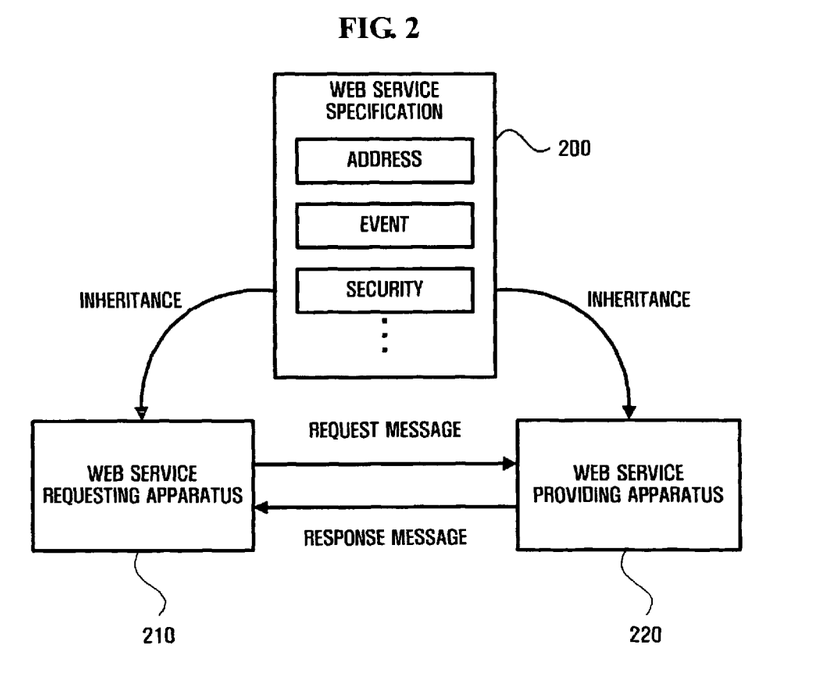
FIG. 2 is a conceptual view showing a web service system according to an exemplary embodiment of the present invention.

FIG. 2 is a conceptual view showing a web service system according to an exemplary embodiment of the present invention. The web service system includes a web service requesting apparatus and a web service providing apparatus.

The web service requesting apparatus 210 transmits a request message, with reference to a WSDL document of a web service provider that provides a web service to be requested, in order to receive a web service. Accordingly, the web service providing apparatus 220, which receives the request message, generates a response message and transmits the generated response message to the web service requesting apparatus 210.

The information contained in the WSDL document is referred to when the web service requesting apparatus 210 generates an application program. The WSDL document may be stored in the web service requesting apparatus 210 before the web service is requested or may be received from a separate apparatus and referred to when the web service is requested.

The response message is a result value for the web service requested by the web service requesting apparatus 210. The web service providing apparatus 220 can directly calculate and provide the result value. When the web service providing apparatus 220 cannot calculate the result value, information for a separate apparatus which can provide the result value may be included in the response message, and then the web service requesting apparatus 210 can request the result value again from the separate apparatus. Here, the information for the separate apparatus may be a pointer for the web service.

The web service requesting apparatus 210 and the web service providing apparatus 220 transmit and receive the messages and provide the web service according to a web service specification 200.

In the exemplary embodiment of the present invention, the web service specification 200 can be created by a virtual class to be inheritable. The web service requesting apparatus 210 and the web service providing apparatus 220 inherit the web service specification 200 so as to communicate with each other.

The web service specification 200 can be provided by the web service providing apparatus 220 or may be provided by a separate apparatus.

In the WSDL document, accessibility to the web service and the functions of the web service are described. The web service requesting apparatus 210 refers to the WSDL document, determines accessibility to the web service and the functions of the web service, and receives the web service.

Figure 3:
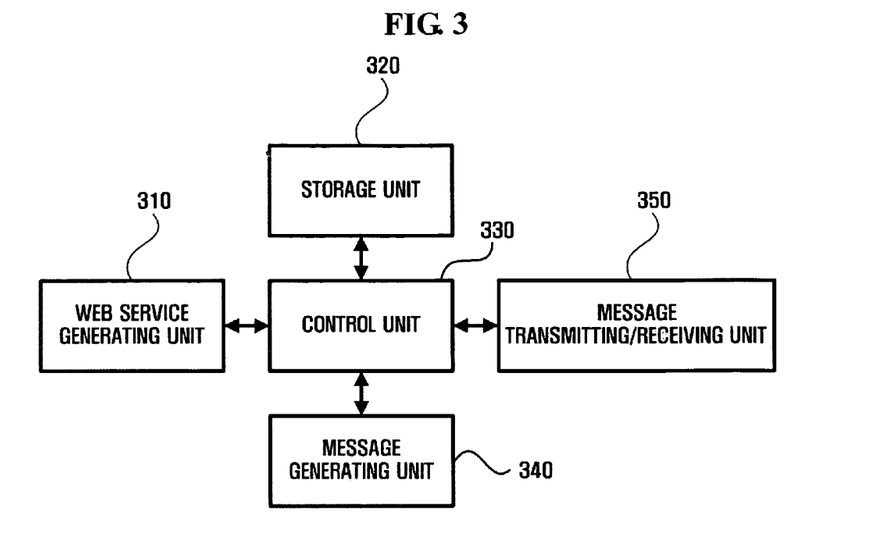
FIG. 3 is a block diagram showing a web service providing apparatus according to an exemplary embodiment of the present invention.

FIG. 3 is a block diagram showing the web service providing apparatus 220 according to the exemplary embodiment of the present invention. The web service providing apparatus 220 includes a storage unit 320, a web service generating unit 310, a control unit 330, a message transmitting/receiving unit 350, and a message generating unit 340.

The storage unit 320 stores an interface document including inheritance information and service processing logic.

Here, the interface document includes a WSDL document in which an interface for calling the web service is described. Hereinafter, an exemplary WSDL document is described.

The web service specification 200 includes a web service address, a web service event, web service security, a web service policy, and so forth. In the storage unit 320, the web service specification 200 to be provided by the web service providing apparatus 220 is stored.

Here, the web service specification 200 of the exemplary embodiment of the present invention is created by a virtual class to be inheritable. That is, the web service to be provided by the web service providing apparatus 220 inherits the web service specification 200. To this end, the functions for implementing the web service specification 200 can be defined in the web service.

The WSDL document describes an interface for calling the web service to be provided by the web service providing apparatus 220. The WSDL document includes a message representing parameter information required for calling the web service, a format, a port type corresponding to a service to be called, bindings having binding work information, a port for calling the service, and a service.

Here, the WSDL document of the exemplary embodiment of the present invention can include inheritance information. The inheritance information can include at least one of an access modifier for the web service and an access modifier for the functions of the web service.

The access modifier includes public, private, and protected. This provides the features of controlling access to an object in object-oriented programming, such as "public," "private," and "protected." For example, if the web service is declared as "public," access from the web service providing apparatus 220 and access outside the web service providing apparatus 220 are unrestricted. In the meantime, if the web service is declared as "private," access from the web service providing apparatus 220 is unrestricted, but access outside the web service providing apparatus 220 is restricted.

Here, the access from the web service providing apparatus 220 can be redefined through the WSDL document.

That is, since the access modifier to the web service and the functions of the web service is assigned in the WSDL document, the web service providing apparatus 220 can control access of the web service requesting apparatus 210 that wants to use the web service.

The message generating unit 340 generates a response message including a result value for the requested web service as a response to a received service request message with reference to the service processing logic stored in the storage unit 320. At this time, when the final result value cannot be calculated by the stored service processing logic, the message generating unit 340 can generate a message including an intermediate result value calculated by the stored service processing logic and a location of the web service (for example, URL) where the final result value can be calculated.

The message transmitting/receiving unit 350 receives the request message for the web service according to the web service specification 200 stored in the storage unit 320 and, as a response to the request message, transmits the response message generated by the message generating unit 340. At this time, the message transmitting/receiving unit 350 receives the request message and transmits the response message according to the SOAP.

In the meantime, the web service providing apparatus 220 can further include the web service generating unit 310. The web service generating unit 310 generates a web service for the service request message.

That is, the web service providing apparatus 220 generates an object of the web service. This object may be an object for the web service stored in the storage unit 320 or may be an object for a web service that is obtained by incorporating a plurality of web services stored in the storage unit 320.

The web service generated in such a manner and the web service stored in the storage unit 320 is transferred to the web service requesting apparatus 210 through the message transmitting/receiving unit 350.

The control unit 330 performs the overall control for the storage unit 320, the web service generating unit 310, the message transmitting/receiving unit 350, the message generating unit 340, and the apparatus.

Figure 4:
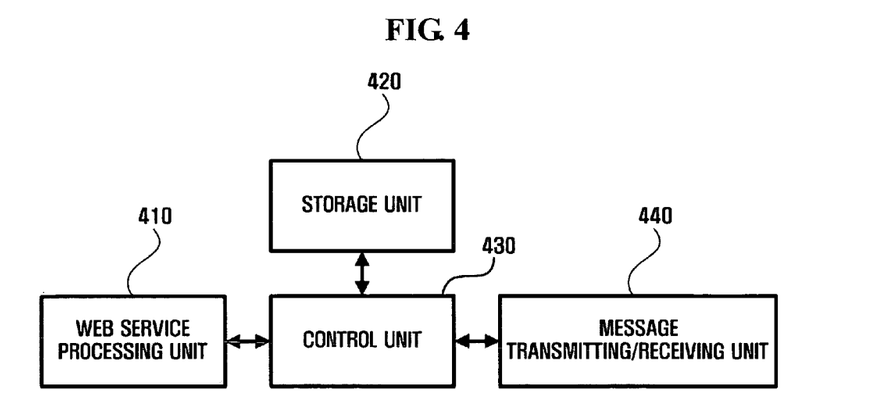
FIG. 4 is a block diagram showing a web service requesting apparatus according to an exemplary embodiment of the invention.

FIG. 4 is a block diagram showing the web service requesting apparatus 210 according to the exemplary embodiment of the present invention. The web service requesting apparatus 210 includes a storage unit 420, a web service processing unit 410, a control unit 430, and a message transmitting/receiving unit 440.

The storage unit 420 stores an interface document including inheritance information.

Here, the interface document includes a WSDL document in which an interface for calling the web service is described. Hereinafter, an exemplary WSDL document is illustrated.

As described above, the WSDL document describes the interface for calling the web service to be provided by the web service providing apparatus 220. The WSDL document of the exemplary embodiment of the present invention can include inheritance information, and the inheritance information can include at least one of the access modifier for the web service and the access modifier for the functions of the web service.

The web service requesting apparatus 210 can directly receive the WSDL document from the web service providing apparatus 220. Further, the web service requesting apparatus 210 can search a list of web services registered in a separate service registering apparatus using a UDDI system so as to select a desired web service and can receive the WSDL document of the web service providing apparatus 220.

The WSDL document stored in the storage unit 420 is transferred through this process. As the web service to be requested is changed, the WSDL document to be stored can be changed.

The message transmitting/receiving unit 440 transmits the request message for the web service and receives the response message as a response to the request message. Here, the response message can include the result value determined by the web service for the request message. Further, the response message may include an intermediate result value and a location of a web service (for example, URL) where a final result value can be calculated. At this time, the message transmitting/receiving unit 440 can transmit the request message and receive the response message according to the SOAP. The received response message is transferred to the web service processing unit 410.

The web service processing unit 410 performs access to the web service and processing for the web service with reference to the transferred response message and the WSDL document stored in the storage unit 420. That is, the web service processing unit 410 determines whether the final result value for the web service is included in the response message, causes the web service requesting apparatus 210 to use the result value when the final result value is included in the response message, and causes the message transmitting/receiving unit 440 to retransmit the request message with reference to the intermediate result value included in the response message and the location of a web service when the final result value is not included in the response message.

The web service processing unit 410 can process the web service with reference to the WSDL document. At this time, the web service processing unit 410 can confirm the inheritance relationship of the web service and the access modifier. Here, the web service processing unit 410 can confirm the access modifier to the functions of the web service, as well as the access modifier to the web service itself.

Then, the web service processing unit 410 can know accessibility of the web service and the functions of the web service and use an accessible web service and accessible functions of the web service.

The control unit 430 performs the overall control for the storage unit 420, the web service processing unit 410, the message transmitting/receiving unit 440, and the web service requesting apparatus 210.

Figure 5:
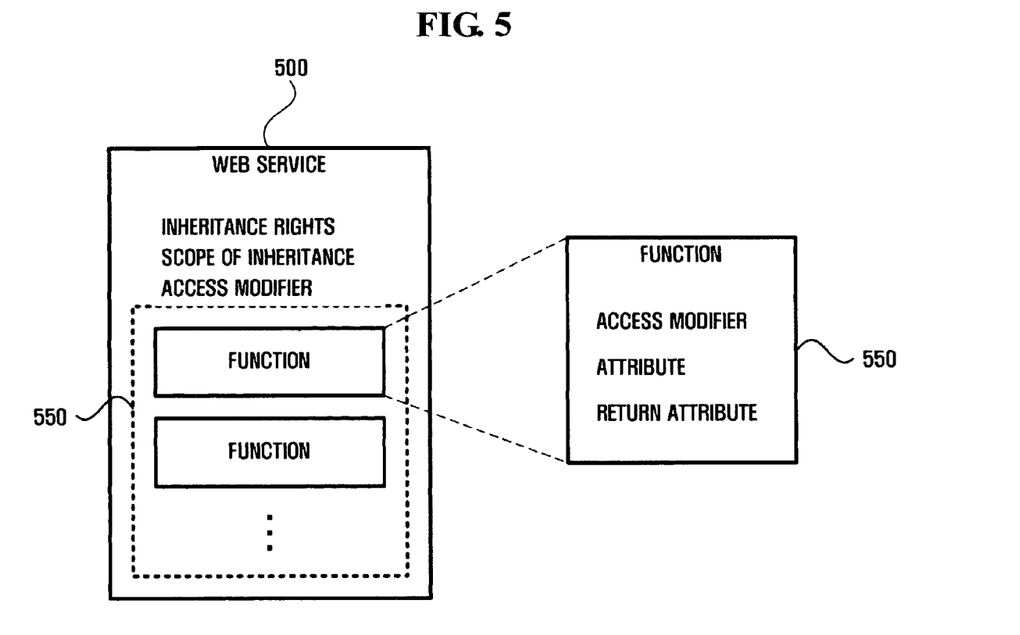
FIG. 5 is a diagram showing the configuration of a web service according to an exemplary embodiment of the present invention.

FIG. 5 is a diagram showing the configuration of the web service according to the exemplary embodiment of the present invention. The web service 500 includes information such as inheritance rights, the scope of inheritance, the access modifier ("public," "private," and "protected"), and so forth. The web service 500 has functions 550 for providing its features.

Here, each of the functions 550 includes "access modifier," "attribute" (virtual, static), "return attribute" (value, reference), and so forth.

That is, the web service requesting apparatus 210 confirms accessibility of the web service 500 and inheritance right, and then uses the functions 550 of the web service according to the result. At this time, the web service requesting apparatus 210 can use the functions 550 of the web service according to the accessibility, the attribute, and the return attribute.

Figure 6A:
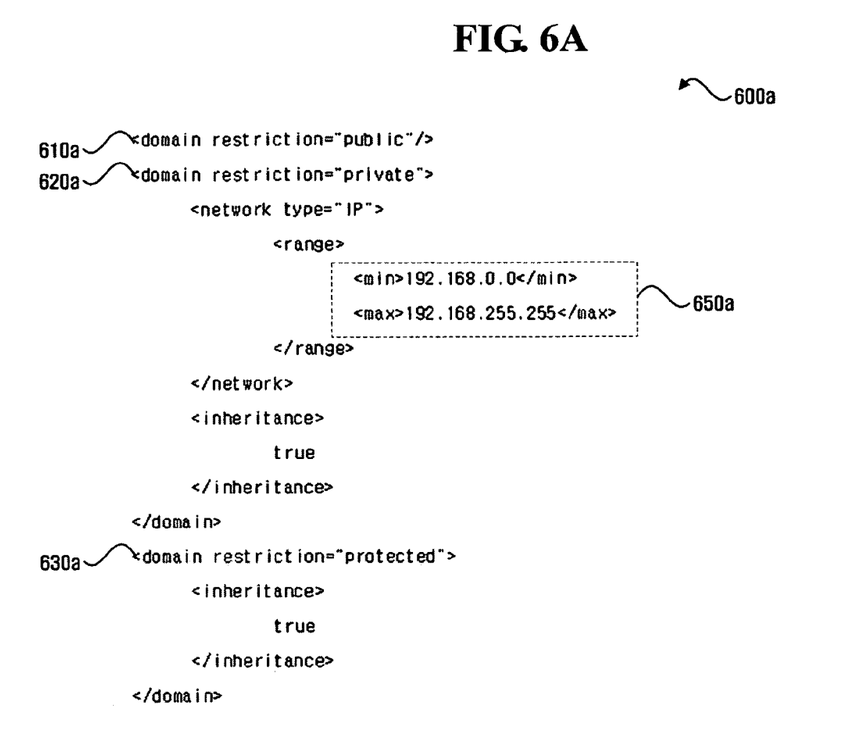
FIGS. 6A-6E are diagrams, each showing a part of a WSDL document according to an exemplary embodiment of the present invention.

FIG. 6A is a diagram showing a part 600*a* of the WSDL document according to the exemplary embodiment of the present invention in which the scope of a domain is defined according to the access modifier.

Referring to FIG. 6A, when the access modifier is "public" (610*a*), the inheritance is unrestricted.

In the meantime, FIG. 6A shows that the inheritance is possible only in a range of an IP address from 192.168.0.0 to 192.168.255.255(650*a*) when the access modifier is "private" (620*a*). Further, it can be understood that the inheritance is unrestricted when the access modifier is "protected" (630*a*).

That is, when the web service is declared as "public" (610*a*), the access and inheritance thereof is unrestricted. However, when the web service is declared as "private" (620*a*), only the web service requesting apparatus 210 having the IP address ranging from 192.168.0.0 to 192.168.255.255 can inherit and use the web service.

Figure 6B:
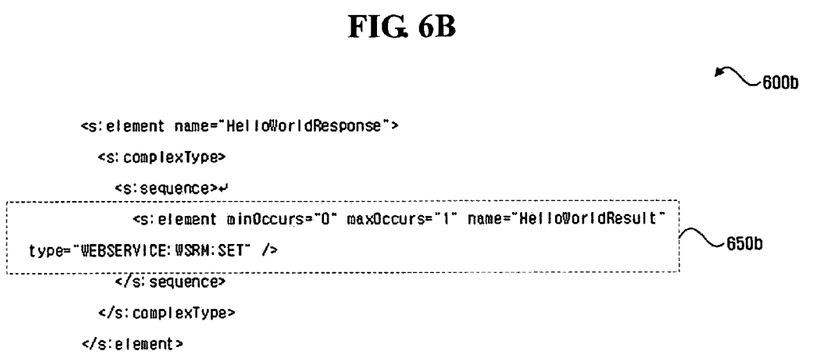

FIG. 6B is a diagram showing a part 600*b* of the WSDL document according to the exemplary embodiment of the present invention in which a call for the web service is defined.

The web service requesting apparatus 210 can call and inherit the web service itself. FIG. 6B shows the syntax 650*b* for calling the functions of the web service.

That is, the web service requesting apparatus 210 can call the web service itself or the functions of the web service.

In FIG. 6B, WEBSERVICE represents that an object to be called is the web service, WSRM represents the web service, and SET represents the function of the web service.

The web service providing apparatus 220 transmits the response message including the URL of the web service as a response to the request message for a specific web service for the sake of access to the web service for the web service requesting apparatus 210. The web service requesting apparatus 210 performs the access to the web service with reference to the URL of the web service included in the response message.

Figure 6C:
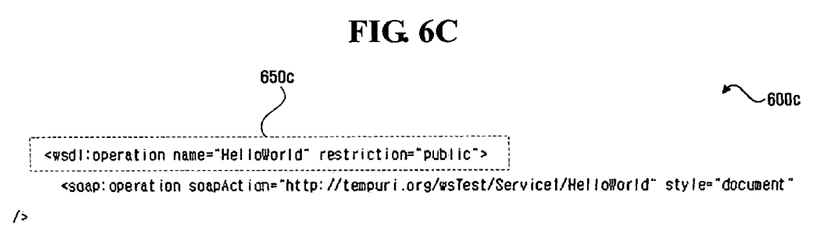

FIG. 6C is a diagram showing a part 600*c* of the WSDL document according to the exemplary embodiment of the present invention in which a call for the function is defined. In FIG. 6C, the function of the web service is declared as "public" (650*c*).

The function of the web service can be declared as one of the following access modifiers: "public," "private," and "protected." Accessibility of the web service requesting apparatus 210 can be determined according to the access modifier.

A function "HelloWorld" illustrated in FIG. 6C is declared as "public," and thus access to the function from the web service requesting apparatus 210 is unrestricted.

Figure 6D:
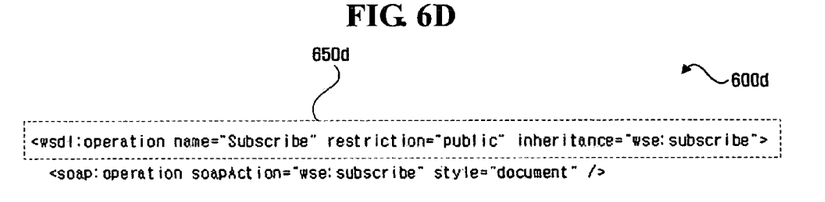

FIG. 6D is a diagram showing a part 600*d* of the WSDL document according to the exemplary embodiment of the present invention in which a call for the function of the web service specification 200 is defined. In FIG. 6D, the function of the web service specification 200 is declared as "public" (650*d*).

The function of the web service specification 200 can be declared by one of the following access modifiers: "public," "private," and "protected." Accessibility of the web service requesting apparatus 210 can be determined according to the access modifier.

A function "Subscribe" illustrated in FIG. 6D is declared as "public," and thus access to the function from the web service requesting apparatus 210 is unrestricted.

In the meantime, the function "Subscribe" represents the inheritance of a function "subscribe" of the web service event which is one of the web service specification 200.

Figure 6E:
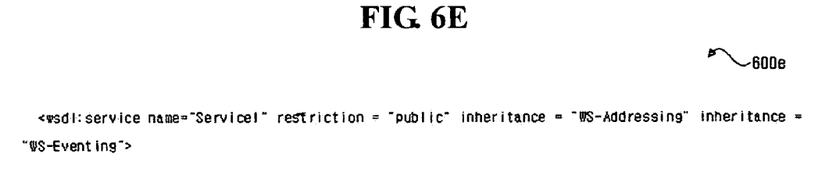

FIG. 6E is a diagram showing a part 600e of the WSDL document according to the exemplary embodiment of the present invention in which a call for the web service specification 200 is defined. In FIG. 6E, the web service specification 200 is declared as "public."

The web service specification 200 can be declared by one of the following access modifiers: "public," "private," and "protected." Accessibility of the web service requesting apparatus 210 can be determined according to the access modifier.

A web service "Service1" illustrated in FIG. 6E is declared as "public," and thus access to the web service from the web service requesting apparatus 210 is unrestricted.

In the meantime, the web service "Service1" represents the inheritance of the web service address and the web service event of the web service specification 200.

Figure 7:
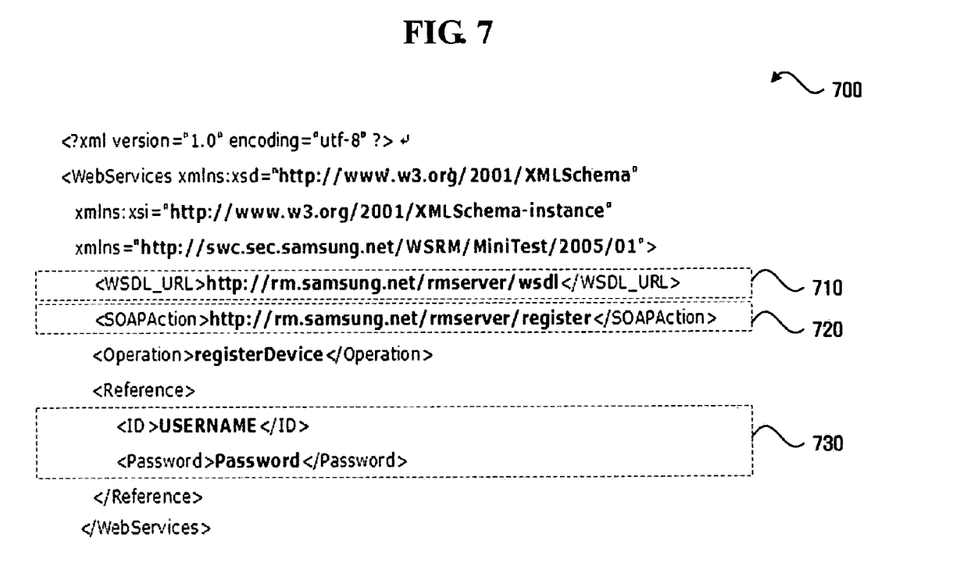
FIG. 7 is a diagram showing a response message of a web service providing apparatus according to an exemplary embodiment of the present invention.

FIG. 7 is a diagram showing a response message 700 of a web service providing apparatus according to the exemplary embodiment of the present invention. In FIG. 7, the response message includes the URL 710 of the web service.

That is, the web service requesting apparatus 210 can access the web service using the URL 710 of the web service included in the response message. At this time, the message can be transmitted according to the SOAP 720.

The response message 700 may include additional information about access and use of the web service. In FIG. 7, login information 730 of the web service is included in the response message 700.

Figure 8:
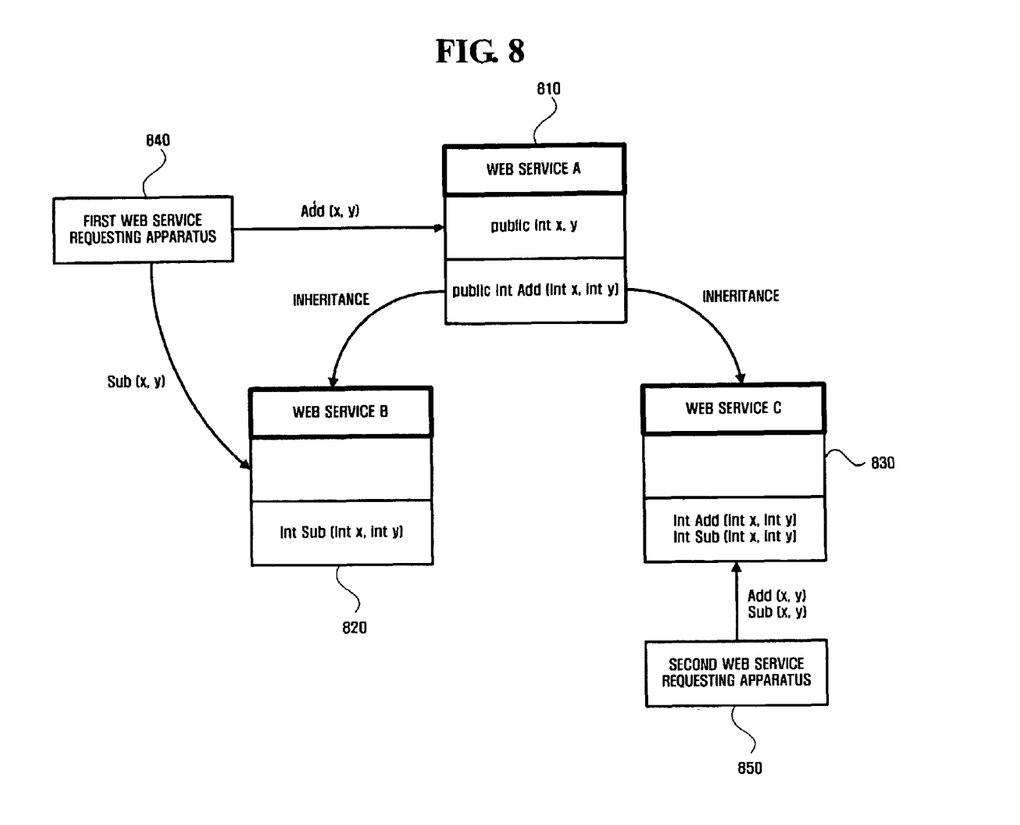
FIG. 8 is a diagram showing inheritance and reuse of a web service according to an exemplary embodiment of the present invention.

FIG. 8 is a diagram showing the inheritance and reuse of the web service according to an exemplary embodiment of the present invention. In particular, FIG. 8 shows the relationship among a web service A 810, a web service B 820, a web service C 830, a first web service requesting apparatus 840, and a second web service requesting apparatus 850.

The web service B 820 and the web service C 830 inherit the web service A 810. Here, the web service A 810 includes two parameters (int x, int y) which are declared as "public," and one public function (int ADD(int x, int y)) having these parameters.

The web service B 820, which inherits the web service A 810, includes one function (int Sub(int x, int y)) having two parameters, which are declared in the web service A 810. Accordingly, the first web service requesting apparatus 840 is connected to the web service B 820 so as to use the function "Sub" and is connected to the web service A 810 so as to use the function "Add."

In the meantime, the web service C 830, which inherits the web service A 810, redefines the function "Add" declared in the web service A 810 and the function "Sub" having two parameters. Accordingly, the second web service requesting apparatus 850 is connected to the web service C 830 so as to use the functions "Add" and "Sub."

Figure 9:
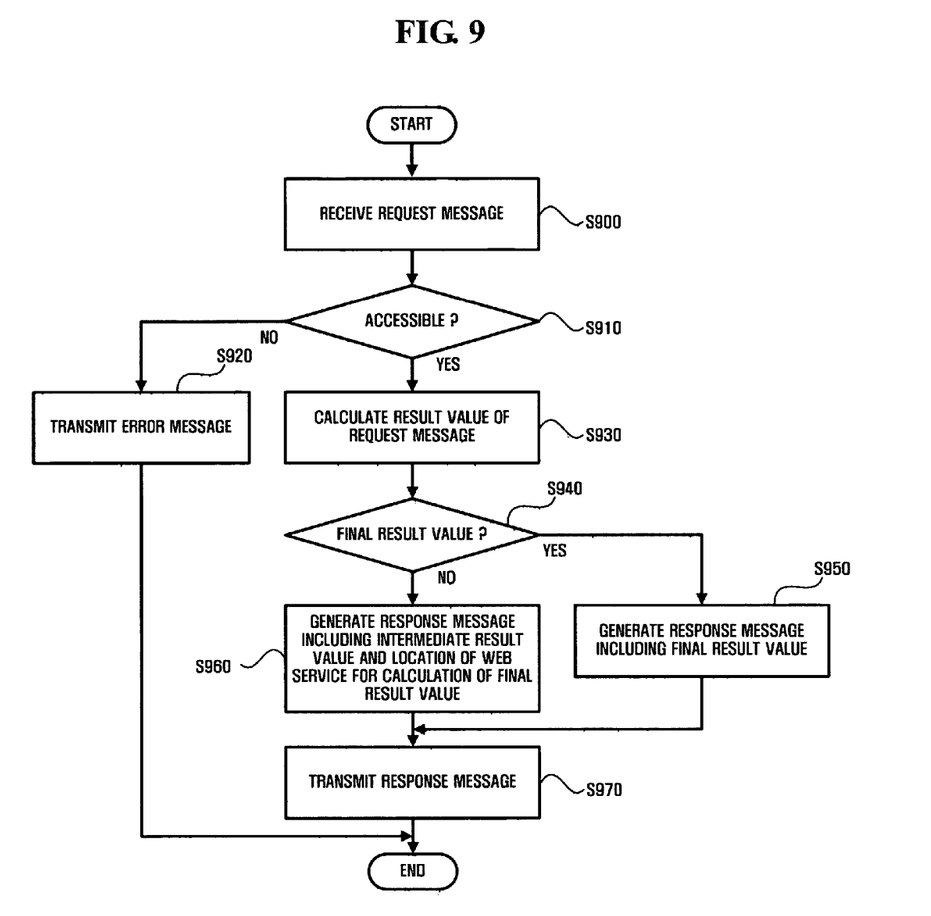
FIG. 9 is a flow chart showing a process of providing a web service according to an exemplary embodiment of the present invention.

FIG. 9 is a flow chart showing a process of providing a web service according to an exemplary embodiment of the present invention.

In order to provide the web service, the web service providing apparatus 220 first receives the request message for the web service from the web service requesting apparatus 210 (S900).

Next, the web service providing apparatus 220 determines the accessibility of the web service included in the received request message (S910). As the result of the determination of the accessibility, if it is determined that the web service is accessible, the web service providing apparatus 220 executes the next operation for providing the web service. If it is determined that the web service is inaccessible, the web service providing apparatus 220 transmits an error message to the web service requesting apparatus 210 (S920).

While progressing to the next operation for providing the web service, the web service providing apparatus 220 calculates the result value for the request message using the stored service processing logic (S930). At this time, it is determined whether the result value calculated by the stored service processing logic (S940) is the final result value. As the result of the determination, if the calculated value is the final result value, the web service providing apparatus 220 generates the response message including the final result value (S950).

When the final result value cannot be calculated by the stored service processing logic, the web service providing apparatus 220 includes the intermediate result value calculated by the service processing logic and the location of a web service that can calculate the final result value into the response message (S960).

Then, the web service providing apparatus 220 transmits the generated response message to the web service requesting apparatus 210 (S970). At this time, the web service providing apparatus 220 can transmit the response message according to the SOAP.

In the meantime, the web service providing apparatus 220 may generate a separate web service for the service request message of the web service requesting apparatus 210 and may provide that to the web service requesting apparatus 210.

Figure 10:
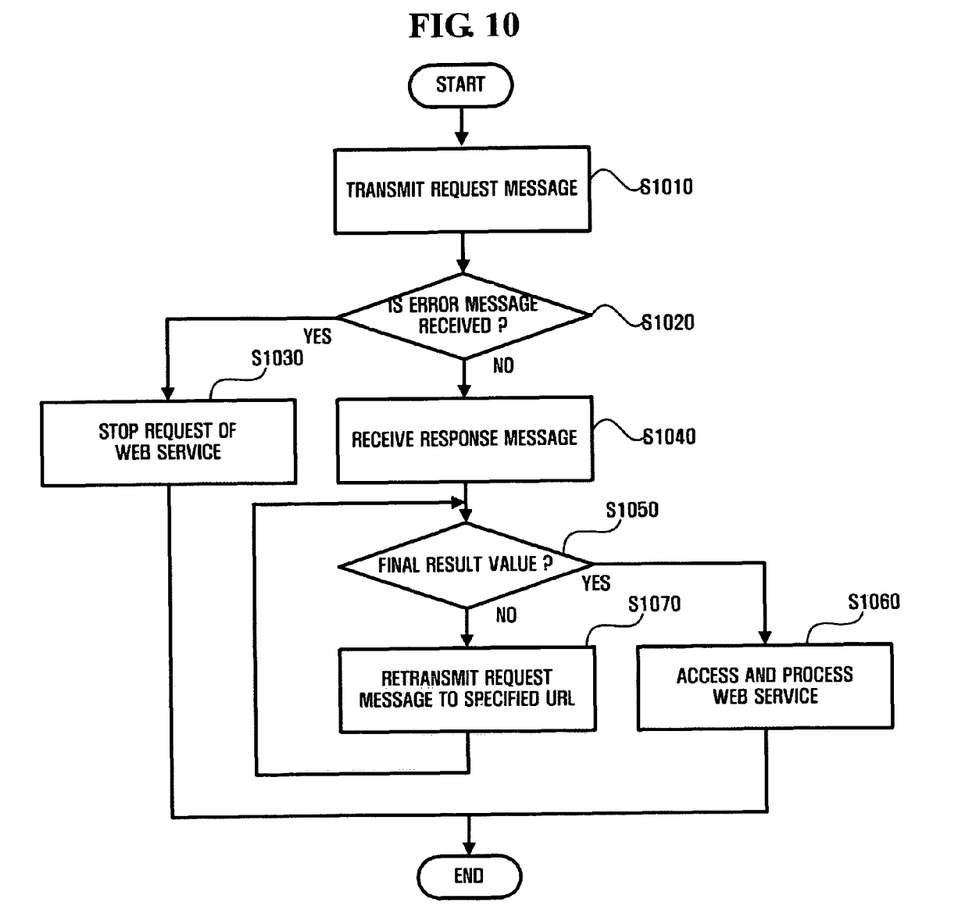
FIG. 10 is a flow chart showing a process of requesting a web service according to an exemplary embodiment of the present invention.

FIG. 10 is a flow chart showing a process of requesting a web service according to an exemplary embodiment of the present invention.

In order to receive the web service, the web service requesting apparatus 210 transmits the request message of the web service with reference to the WSDL document (S1010). That is, the web service requesting apparatus 210 determines the accessibility of the web service and so on and then transmits the request message. Here, a request message for an inaccessible web service may be transmitted. In this case, the web service requesting apparatus 210 determines whether an error message is received (S1020). If the web service requesting apparatus 210 receives the error message, the web service requesting apparatus 210 stops the request of the web service accordingly (S1030).

If the error message is not received, the web service requesting apparatus 210 receives the response message as a response to the request message (S1040). At this time, the response message can include the final result value for the web service to be requested or can include the intermediate result value and the URL of a web service where the final result value can be calculated.

Accordingly, the web service requesting apparatus 210 confirms whether the final result value is included in the response message (S1050). If the final result value is included in the response message, the web service requesting apparatus 210 accesses the web service and performs the processing for the web service (S1060). If the intermediate result value and the URL of the web service where the final result value can be calculated are included in the response message, the web service requesting apparatus 210 retransmits the response message including the intermediate result value to the specified URL (S1070). That is, the web service requesting apparatus 210 transmits the request message to a separate apparatus.

Next, the web service requesting apparatus 210 receives the response message from the separate apparatus. At this time, the web service requesting apparatus 210 also determines whether the final result value is included in the response message. If the final result value is not included in the response message, the web service requesting apparatus 210 transmits the request message including the intermediate result value to the URL included in the response message until the final result value is received.

Figure 11:
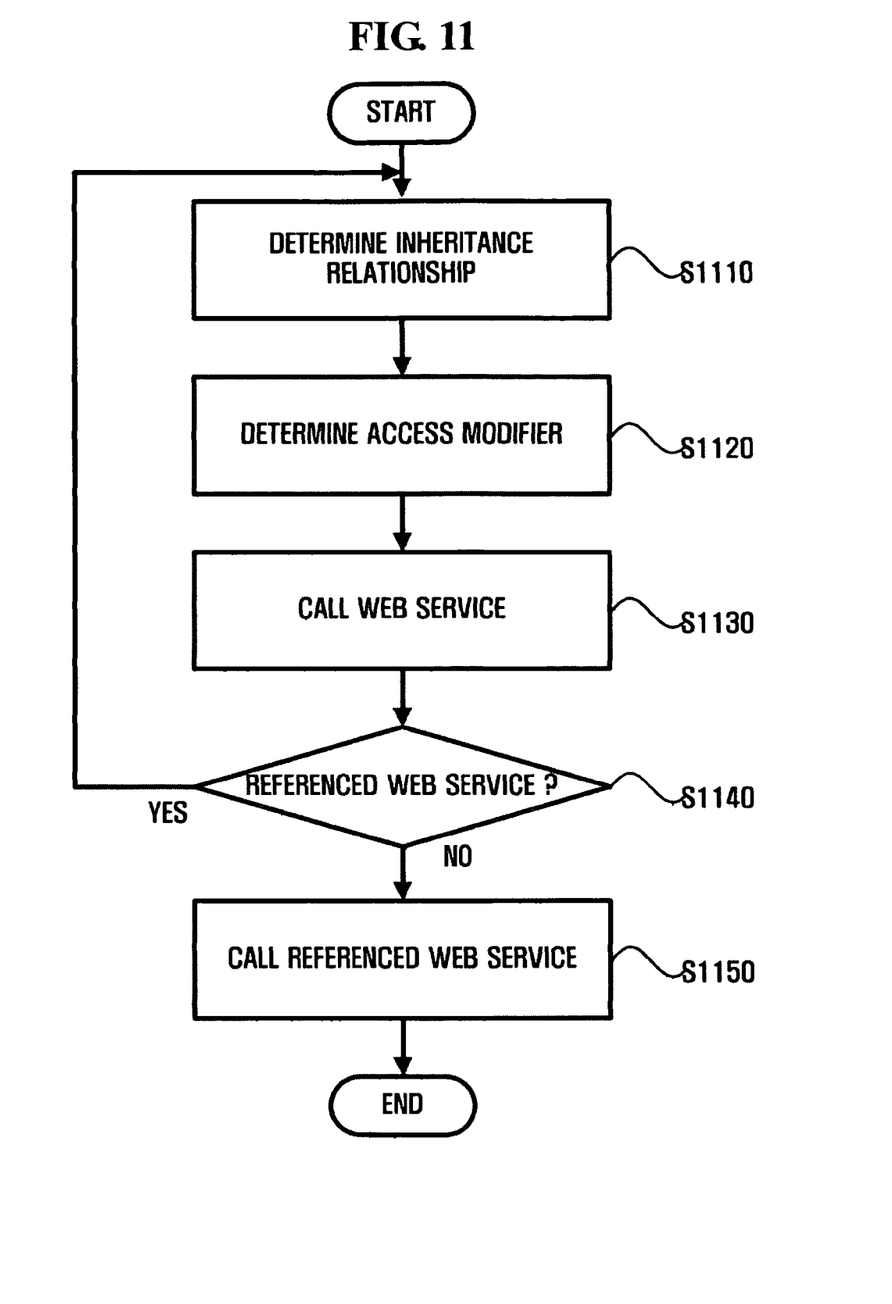
FIG. 11 is a flow chart showing a web service managing process according to an exemplary embodiment of the present invention.

FIG. 11 is a flow chart showing a process of managing a web service according to an exemplary embodiment of the present invention.

When calling the web service, the web service requesting apparatus 210 determines the inheritance relationship of the called web service (S1110) and determines the access modifier (S1120). Then, the web service is called (S1130). At this time, it is determined whether the called web service is a web service referenced by a specific web service (S1140). As a result, when the called web service is referenced by the specific web service, the web service requesting apparatus 210 refers to the WSDL document in order to redetermine the inheritance relationship for the specific web service and the web service access modifier (S1110 and S1120). If access to the specific web service is possible, the specific web service is called (S1130).

The call for the web service to be referenced (specific web service) can be repeated until the web service to be referenced is determined. If is determined that specific web service referenced by the called web service is not referenced by another specific web service (S1140), the referenced web service is called (S1150).

Although the present invention has been described in connection with the exemplary embodiments, it will be apparent to those skilled in the art that various modifications and changes may be made thereto without departing from the scope and spirit of the invention. The exemplary embodiments should be considered in a descriptive sense only and not for purposes of limitation. Therefore, the scope of the invention is defined not by the detailed description of the invention but by the appended claims and their equivalents, and all differences within the scope will be construed as being included in the present invention.

According to the object-oriented web service control apparatus and method of one or more of the exemplary embodiments of the present invention described above, the following advantages may be obtained.

First, the access modifier for domains, functions, services and so on is included in the WSDL containing the detailed information for the web service, and thus the access to the web service by the web service requesting apparatus can be controlled.

Second, the URL of the web service is provided, and thus the inheritance of the web service itself can be provided.

Third, the web service can be reused by the web service requesting apparatus.

What is claimed is:

1. A web service providing apparatus comprising:
a storage unit which stores an interface document comprising inheritance information and service processing logic;
a message generating unit which, with reference to the service processing logic, generates a response message comprising at least one of a result value for a received request for a web service and a location where the result value is calculated; and
a message transmitting and receiving unit which, according to a web service specification, receives a request message comprising the request for the web service and transmits the generated response message as a response to the request message,
wherein the inheritance information comprises at least one of an access modifier for the web service and an access modifier for functions of the web service.

2. The apparatus of claim 1, wherein the interface document comprises a Web Services Description Language (WSDL) document in which an interface for calling the web service is described.

3. The apparatus of claim 1, wherein the web service specification is created by a virtual class to be inheritable.

4. The apparatus of claim 1, wherein the access modifier comprises at least one of a public modifier, a protected modifier, and a private modifier.

5. The apparatus of claim 1, wherein the message transmitting/receiving unit receives the request message and transmits the response message according to Simple Object Access Protocol (SOAP).

6. The apparatus of claim 1, further comprising:
a web service generating unit which generates the web service for the request message.

7. The apparatus of claim 1, wherein the response message generated by the message generating unit comprises the result value for the received request for the web service if the message generating unit is able to calculate the result value for the requested web service, and
wherein the response message generated by the message generating unit comprises the location where the result value is calculated if the message generating unit is not able to calculate the result value for the requested web service.

8. The apparatus of claim 7, wherein the location comprises a uniform resource locator (URL) of a different web service providing apparatus that is able to calculate a result value for the requested web service.

9. A web service requesting apparatus comprising:
a storage unit which stores an interface document comprising inheritance information;
a message transmitting and receiving unit which transmits a request message for a web service according to a web service specification and, as a response to the request message, receives a response message comprising at least one of a result value from the web service and a location where the result value is calculated; and
a web service processing unit which performs access to the web service and processing for the web service with reference to the response message and the interface document,
wherein the inheritance information comprises at least one of an access modifier for the web service and an access modifier for functions of the web service.

10. The apparatus of claim 9, wherein the interface document comprises a Web Services Description Language (WSDL) document in which an interface for calling the web service is described.

11. The apparatus of claim 9, wherein the web service specification is created by a virtual class to be inheritable.

12. The apparatus of claim 9, wherein the access modifier comprises at least one of a public modifier, a protected modifier, and a private modifier.

13. The apparatus of claim 9, wherein the web service processing unit accesses the web service and the functions of the web service with reference to the inheritance information.

14. The apparatus of claim 9, wherein the message transmitting/receiving unit transmits the request message and receives the response message according to Simple Object Access Protocol (SOAP).

15. The apparatus of claim 9, wherein the response message received by the message transmitting and receiving unit comprises the result value from the web service if a device receiving the request message is able to calculate the result value for the web service, and
wherein the response message received by the message transmitting and receiving unit comprises the location where the result value is calculated if the device receiving the request message is not able to calculate the result value for the web service.

16. The apparatus of claim 15, wherein the location comprises a uniform resource locator (URL) of a different device that is able to calculate a result value for the requested web service.

17. A method of providing a web service by a web service providing apparatus, the method comprising:
storing an interface document comprising inheritance information and service processing logic;
receiving a request message for a web service according to a web service specification;
generating, with reference to the service processing logic, a response message comprising at least one of a result value for the request message and a location where the result value is calculated; and
transmitting the generated response message according to the web service specification,
wherein the inheritance information comprises at least one of an access modifier for the web service and an access modifier for functions of the web service.

18. The method of claim 17, wherein the interface document comprises a Web Services Description Language (WSDL) document in which an interface for calling the web service is described.

19. The method of claim 17, wherein the web service specification is created by a virtual class to be inheritable.

20. The method of claim 17, wherein the access modifier comprises at least one of a public modifier, a protected modifier, and a private modifier.

21. The method of claim 17, wherein the receiving of the request message comprises receiving the request message according to Simple Object Access Protocol (SOAP).

22. The method of claim 17, wherein the transmitting of the response message comprises transmitting the response message according to Simple Object Access Protocol (SOAP).

23. The method of claim 15, further comprising:
generating the web service for the request message.

24. The method of claim 17, wherein the generated response message comprises the result value for the request message if the web service providing apparatus is able to calculate the result value for the web service, and
wherein the generated response message comprises the location wherein the result value is calculated if the web service providing apparatus is not able to calculate the result value for the web service.

25. The method of claim 24, wherein the location comprises a uniform resource locator (URL) of a different web service providing apparatus that is able to calculate a result value for the web service.

26. A method of requesting a web service by a web service requesting apparatus, the method comprising:
storing an interface document comprising inheritance information;
transmitting a request message for a web service according to a web service specification;
receiving, as a response to the request message, a response message comprising at least one of a result value for the web service and a location where the result value is calculated; and
performing access to the web service and processing for the web service with reference to the response message and the interface document,
wherein the inheritance information comprises at least one of an access modifier for the web service and an access modifier for functions of the web service.

27. The method of claim 26, wherein the interface document comprises a Web Services Description Language (WSDL) document in which an interface for calling the web service is described.

28. The method of claim 26, wherein the web service specification is created by a virtual class to be inheritable.

29. The method of claim 26, wherein the access modifier comprises at least one of a public modifier, a protected modifier, and a private modifier.

30. The method of claim 26, wherein the performing of the access to the web service and the processing for the web service comprise accessing the web service and the functions of the web service with reference to the inheritance information.

31. The method of claim 26, wherein the transmitting of the request message comprises transmitting the request message according to Simple Object Access Protocol (SOAP).

32. The method of claim 26, wherein the receiving of the response message comprises receiving the response message according to Simple Object Access Protocol (SOAP).

33. The method of claim 26, wherein the received response message comprises the result value for the web service if a device receiving the request message is able to calculate the result value for the web service, and
wherein the received response message comprises the location where the result value is calculated if the device receiving the request message is not able to calculate the result value for the web service.

34. The method of claim 33, wherein the location comprises a uniform resource locator (URL) of a different device that is able to calculate a result value for the requested web service.

* * * * *